May 6, 1930.   A. H. HOTOPP   1,757,193

CURRENT MEASURING DEVICE

Filed April 23, 1929

INVENTOR
A.H. Hotopp
BY
ATTORNEY

Patented May 6, 1930

1,757,193

UNITED STATES PATENT OFFICE

ALFRED H. HOTOPP, OF HOLLIS, NEW YORK, ASSIGNOR TO AMERICAN TELEPHONE AND TELEGRAPH COMPANY, A CORPORATION OF NEW YORK

CURRENT-MEASURING DEVICE

Application filed April 23, 1929. Serial No. 357,543.

This invention relates to direct current measuring devices, or meters, and more particularly to an improved method of and means for damping the moving coil apparatus in such systems.

One of the primary objects of the arrangements of the invention consists in the provision of means for obtaining greater damping of the movement in one direction than in the other for the moving coil apparatus of the general type usually employed in direct-current meters. To accomplish the purposes of the invention a directional impedance device, such as a low-impedance rectifier, is connected across the moving coil circuit or across an auxiliary coil on the moving apparatus in such a way as to place a low-impedance load on the system for the electromotive force, which is developed by the system, when it is moving in one direction and a very high-impedance load for the electromotive force developed by the system when it is moving in the opposite direction, thus obtaining greater damping of the movement of the apparatus in one direction than in the other. Further objects and features of the invention will appear more fully from the detailed description thereof hereinafter given.

Figure 1:
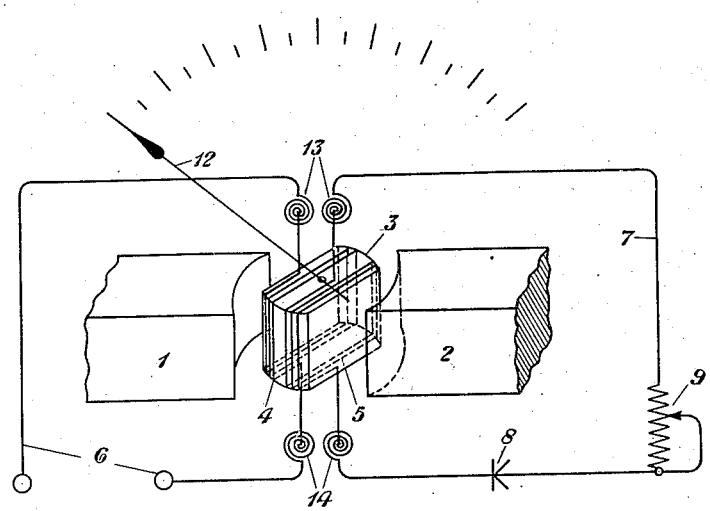
Figure 2:
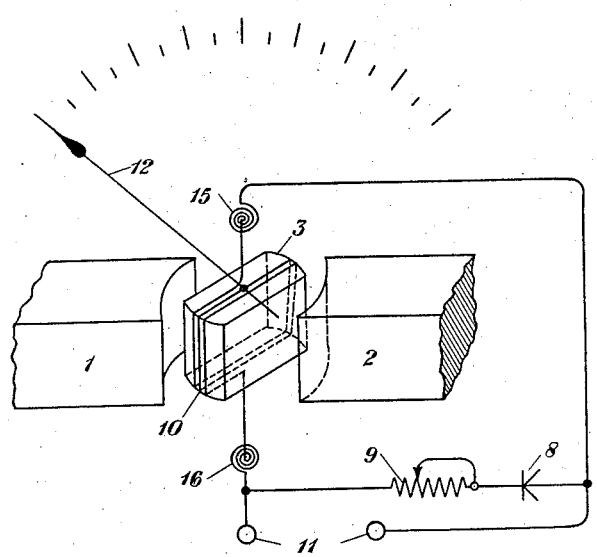

The invention may be more fully understood from the following description, together with the accompanying drawing in the Figures 1 and 2 of which the invention is illustrated. Fig. 1 shows a circuit diagram embodying one form of the invention. Fig. 2 shows a modification thereof. Similar reference characters have been utilized to denote like parts in both of the figures.

In Fig. 1 there is shown a direct current measuring device which comprises the pole pieces 1 and 2 of a permanent magnet. Mounted so as to rotate between these pole pieces would be an armature 3. Upon the armature 3 would be wound a coil 4 included in the circuit 6 to which would be connected the source of current to be measured. Mounted on the armature 3 would be an auxiliary coil 5 which would be included in a circuit 7, which in turn would include a variable resistance 9 and a directional impedance element 8, such, for example, as a low-impedance rectifier of the well-known contact or thin film variety. The armature 3 would control the movement of a pointer 12 co-operating with a scale device. The armature 3 would also be controlled by the restoring springs 13 and 14 whereby it may be returned to a desired position mechanically.

If an electromotive force is applied to circuit 6 and hence to the main moving coil 4, the armature will deflect in the right-hand direction. Then due to the movement of the apparatus in the magnetic field, an opposing electromotive force will be developed in the auxiliary coil 5. If the rectifier 8 is connected in the circuit 7 of the auxiliary coil 5 in such a way as to offer low impedance for the flow of current due to this opposing electromotive force developed in the auxiliary coil 5, then greater damping of the system for movement in the right-hand direction may be obtained. The maximum amount of this damping which can be obtained will, of course, depend upon the design of the auxiliary coil 5 and the resistance of the rectifier. Control of the damping can be had by means of the resistance 9, as shown. If the electromotive force applied to circuit 6 is reduced, the force of the restoring springs 13 and 14 will cause the armature to deflect to the left. An electromotive force will, therefore, be developed in the auxiliary coil 5 in a direction opposite to that developed when the system moved in the right-hand direction. However, it is pointed out that the rectifier is so poled that it will now offer a high impedance to the flow of current for this electromotive force and hence little damping will result from the auxiliary coil system upon a swing of the armature to the left. Accordingly, the invention provides an arrangement which can be made to have greater damping for movement in the right-hand direction than in the left. Obviously by simply reversing the rectifier, greater damping can be obtained in the left-hand direction than in the right-hand direction.

In Fig. 2 is shown a modification of the arrangements of the invention. In this modification, an auxiliary coil is not utilized and the rectifier is connected directly across the moving coil circuit. In Fig. 2 are shown the pole pieces 1 and 2 of a magnet and the moving armature 3, which operates the pointer 12 and is controlled by the restoring springs 15 and 16. Mounted on the armature is the moving coil 10 which is included in the circuit 11 to which is connected the source of current to be measured. Bridged across circuit 11 is the rectifier 8 and the variable resistance 9.

If an electromotive force is connected to circuit 11 and placed across the moving coil 10 in such a way as to obtain deflection of the armature in the right-hand direction, then it will be seen that, due to the movement of the moving coil system in the magnetic field, a counter electromotive force is developed. If the rectifier is connected across the moving coil so as to offer high impedance to the flow of current due to this counter electromotive force, little damping of the system for movement in the right-hand direction will result from the rectifier. If the applied electromotive force is reduced, the force of the restoring springs 15 and 16 will deflect the moving coil in the left-hand direction. The electromotive force developed, due to this movement, will be in a direction which will result in a current flow through the rectifier. Thus additional damping, which can be controlled by resistance 9, will result for movement of the system in the release direction than in the operating direction.

While the invention has been disclosed as embodied in certain specific arrangements which are deemed desirable, it is understood that it is capable of embodiment in many and other widely varied forms without departing from the spirit of the invention as defined by the appended claims.

What is claimed is:

1. A current measuring device comprising an armature deflectible between magnetic pole pieces, a circuit including a moving coil on said armature, said circuit being connected to the source of current to be measured, a second circuit including an auxiliary coil on said armature, and a directional impedance device in said second circuit.

2. A current measuring device comprising an armature deflectible between magnetic pole pieces, a circuit including a moving coil on said armature, said circuit being connected to the source of current to be measured, a second circuit including an auxiliary coil on said armature, and a rectifier in said second circuit so poled as to oppose the flow of current due to the electromagnetic force caused by the movement of said auxiliary coil between said magnetic pole pieces.

In testimony whereof, I have signed my name to this specification this 19th day of April, 1929.

ALFRED H. HOTOPP.